(12) United States Patent
Cok

(10) Patent No.: US 12,218,415 B2
(45) Date of Patent: Feb. 4, 2025

(54) ANTENNA ENCAPSULATION

(71) Applicant: X-Celeprint Limited, Dublin (IE)

(72) Inventor: Ronald S. Cok, Rochester, NY (US)

(73) Assignee: X-Celeprint Limited, Dublin (IE)

( * ) Notice: Subject to any disclaimer, the term of this patent is extended or adjusted under 35 U.S.C. 154(b) by 149 days.

(21) Appl. No.: 17/941,577

(22) Filed: Sep. 9, 2022

(65) Prior Publication Data
US 2024/0088551 A1 Mar. 14, 2024

(51) Int. Cl.
*H01Q 1/38* (2006.01)
*H01Q 1/22* (2006.01)
*H01Q 1/40* (2006.01)

(52) U.S. Cl.
CPC ............ *H01Q 1/38* (2013.01); *H01Q 1/2208* (2013.01); *H01Q 1/40* (2013.01)

(58) Field of Classification Search
None
See application file for complete search history.

(56) References Cited

U.S. PATENT DOCUMENTS

| | | | |
|---|---|---|---|
| 6,262,692 B1 * | 7/2001 | Babb | B60C 23/0493 428/189 |
| 7,622,367 B1 | 11/2009 | Nuzzo et al. | |
| 8,506,867 B2 | 8/2013 | Menard | |
| 8,722,458 B2 | 5/2014 | Rogers et al. | |
| 9,520,537 B2 | 12/2016 | Bower et al. | |
| 9,997,102 B2 | 6/2018 | Rotzoll et al. | |
| 10,198,890 B2 | 2/2019 | Rotzoll et al. | |
| 10,217,308 B2 | 2/2019 | Rotzoll et al. | |
| 10,622,700 B2 | 4/2020 | Cok | |
| 11,398,399 B2 | 7/2022 | Trindade et al. | |
| 11,488,943 B2 | 11/2022 | Bower et al. | |
| 11,490,519 B2 | 11/2022 | Cok | |
| 2016/0093600 A1 | 3/2016 | Bower et al. | |
| 2017/0301282 A1 * | 10/2017 | Rotzoll | H01L 25/167 |
| 2022/0112078 A1 | 4/2022 | Rubino | |
| 2022/0285309 A1 | 9/2022 | Cok et al. | |

* cited by examiner

*Primary Examiner* — Jany Richardson
(74) *Attorney, Agent, or Firm* — Choate, Hall & Stewart LLP; Michael D. Schmitt

(57) ABSTRACT

A micro-module includes a module substrate, an antenna having antenna walls and an antenna top surface disposed on or over the module substrate, and a sealant disposed on the module substrate surface and on at least a portion of the antenna walls. The sealant extends to at least the antenna top surface. The antenna walls and sealant form an enclosed area of the module substrate surface surrounded by the antenna walls and sealant. A module circuit is disposed on or in the module substrate in the enclosed area. The module circuit is electrically connected to the antenna and is responsive to electrical signals received from the antenna. A cap is disposed on or over the antenna top surface and the sealant, encapsulating the module circuit.

18 Claims, 13 Drawing Sheets

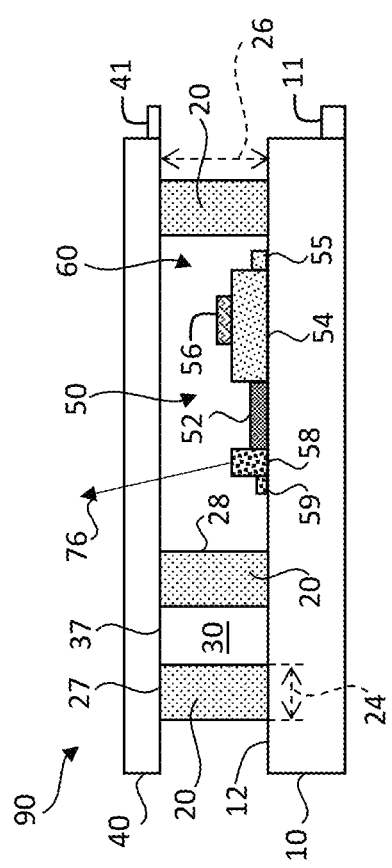

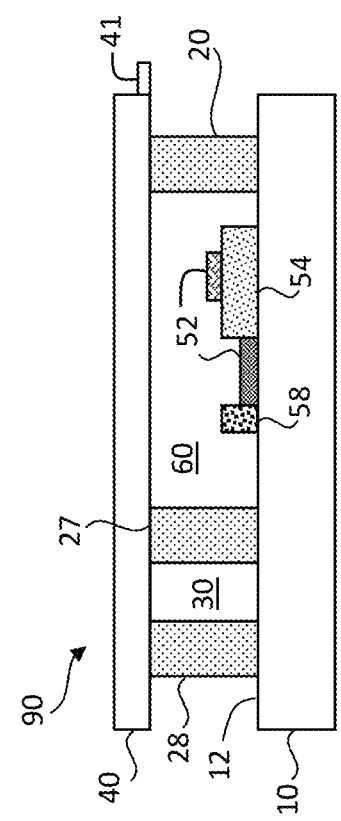
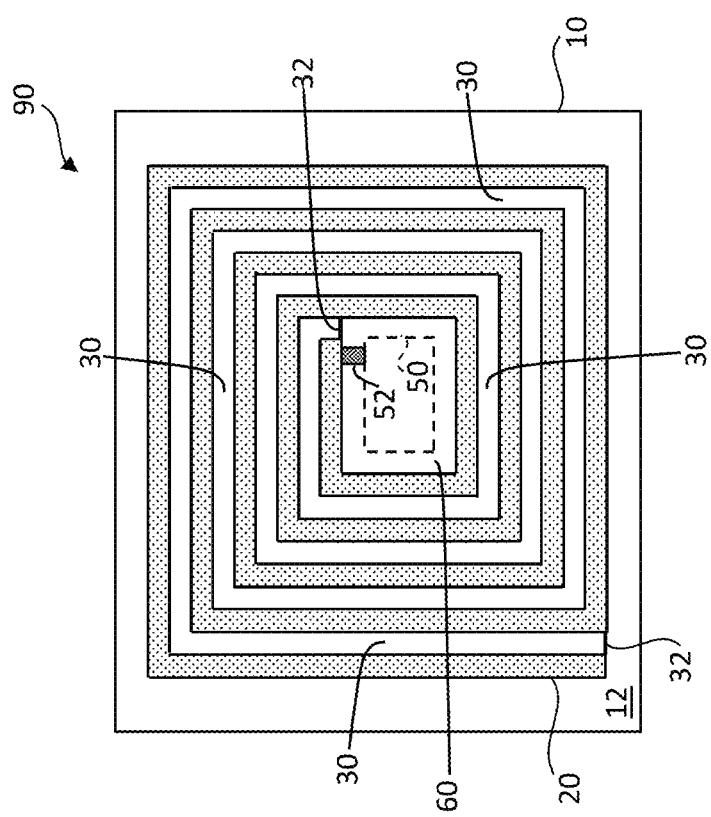
FIG. 3B
FIG. 3A

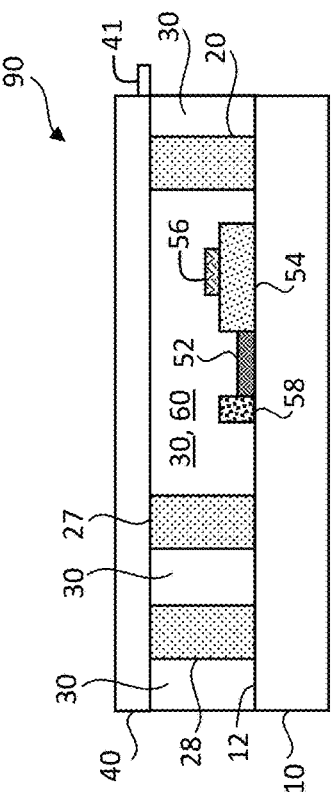
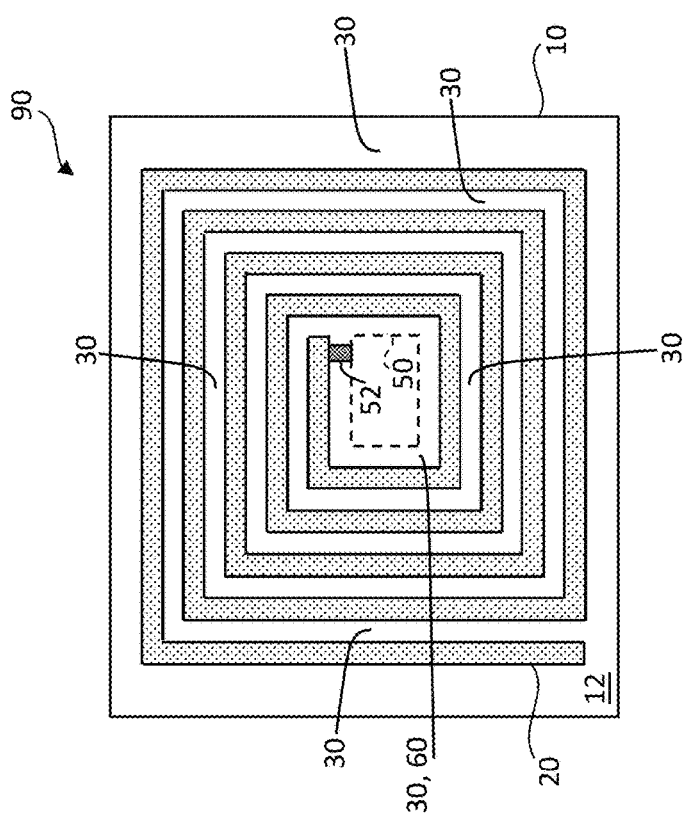
FIG. 5B
FIG. 5A

ANTENNA ENCAPSULATION

FIELD OF THE DISCLOSURE

The present disclosure relates to encapsulated micro-modules incorporating an antenna formed on a micro-module substrate.

BACKGROUND OF THE DISCLOSURE

Micro-systems, for example systems incorporating micro-devices micro-assembled into a micro-module can be powered by or communicate with electromagnetic radiation. For example, radio-frequency identification (RFID) systems use antennas to receive and transmit electromagnetic signals that provide power to the RFID systems. Circuits in the RFID systems receive electromagnetic power signals and respond with electromagnetic identification signals. U.S. Pat. Nos. 10,198,890, 10,217,308, and 9,997,102 teach a hybrid high-security document comprising an antenna with multiple turns, an electronic circuit, and a light emitter mounted on and electrically connected on a substrate separate from the document. U.S. Pat. No. 10,198,890 teaches an electromagnetic communication device including a device substrate, an antenna formed on or in the substrate, and a circuit element.

In practical use, such micro-systems and documents can be subject to environmental abuse. There is a need therefore, for methods, structures, and devices that provide environmental protection to micro-systems and documents.

SUMMARY OF THE DISCLOSURE

The present disclosure provides, among other embodiments, a micro-module comprising a module substrate having a module substrate surface, an antenna disposed on the module substrate surface, the antenna extending along the module substrate surface in a direction parallel to the module substrate surface and extending away from the module substrate surface in a direction perpendicular to the module substrate surface to an antenna top surface defining antenna walls, and a sealant disposed on the module substrate surface and on at least a portion of the antenna walls extending away from the module substrate to a sealant top surface, wherein the antenna walls and sealant define an enclosed area of the module substrate surface surrounded by the antenna walls and the sealant. A module circuit is disposed on or in the module substrate in the enclosed area and electrically connected to the antenna and responsive to electrical signals received from the antenna and a cap is disposed on the antenna top surface and the sealant top surface so that the module circuit is encapsulated.

According to some embodiments of the present disclosure, the antenna has an antenna length on the module substrate, an antenna width on the module substrate, and an antenna height extending away from the module substrate to the antenna top surface in a direction orthogonal to the module substrate surface. The antenna length can be greater than the antenna height and greater than the antenna width.

The module circuit can comprise a light-emitting diode, a resonator, or both a light-emitting diode and a resonator. The light-emitting diode and the resonator can be micro-transfer printed and can comprise broken (e.g., fractured) or separated tethers. The light-emitting diode and the resonator can have a length or width no greater than five hundred microns, two hundred fifty microns, one hundred microns, fifty microns, twenty microns, or ten microns.

The module substrate, the cap, or both the module substrate and the cap can be at least 50%, 70%, 80%, 90%, or 95% transparent to visible light or to light emitted by a light-emitting diode in the module circuit.

The antenna can be operable to provide power to the module circuit with the electrical signals so that the module circuit is powered by the electrical signals received from the antenna. The module circuit can emit light in response to the electrical signals. The module circuit can emit signals (e.g., transmitted with the antenna) in response to the electrical signals. The module circuit can be a micro-transfer-printed module circuit comprising a broken or separated module tether. The module circuit can comprise one or more components disposed on the module substrate, or a circuit substrate disposed on the module substrate, and at least one of the one or more components can be a micro-transfer-printed component comprising a broken or separated component tether. The circuit substrate can comprise a broken (e.g., fractured) or separated circuit substrate tether.

In some embodiments, the sealant comprises discrete portions that define sealant walls in contact with different portions of the antenna walls.

In some embodiments, the antenna forms a spiral on the module substrate. The spiral can be a curve or can be a rectangular spiral with multiple non-collinear straight line segments (e.g., line segments that are not in a line on the module substrate surface). The multiple straight line segments can form one or more open rectangles or squares, e.g., a rectangle or square with at least a portion of one side missing or absent.

According to some embodiments, the sealant, the antenna the walls, the cap, and the module substrate can define multiple separately enclosed volumes. The multiple separately enclosed volumes can be disposed along the length of the spiral. In some embodiments, the antenna walls are interior walls and the sealant fills all volume between the antenna walls, the cap, and the module substrate except in the enclosed area (except in or excluding the enclosed volume laterally bounded by the enclosed area). In some embodiments, the sealant fills volumes between the antenna walls, the cap, and the module substrate including the volume laterally bounded by the enclosed area (including the enclosed volume). In some embodiments, the sealant fills a volume between the module substrate surface and the cap, either including the enclosed area (the enclosed volume) or not including the enclosed area (the enclosed volume).

According to embodiments of the present disclosure, the module substrate is rigid, the cap is rigid, or both the module substrate and the cap are rigid. The module substrate can be flexible, the cap can be flexible, or both the module substrate and the cap can be flexible. The module substrate can be more flexible than the cap or the module substrate can be more rigid than the cap.

According to embodiments of the present disclosure, a document comprises a document substrate and one or more micro-modules disposed in or on the document substrate. The document substrate can comprise paper, cloth, or plastic. The document can comprise or is comprised in a banknote, passport, identification document, or financial instrument. The one or more micro-modules can be laminated between layers of the document and the layers can be transparent or reflective, or one layer can be transparent, and another layer can be reflective.

According to embodiments of the present disclosure, a micro-module comprises a module substrate having a module substrate surface and an antenna disposed on the module substrate surface. The antenna can extend or be disposed along the module substrate surface in a direction parallel to the module substrate surface and can extend away or protrude from the module substrate surface in a direction perpendicular to the module substrate surface to an antenna top surface thereby defining antenna walls. A cap disposed on the antenna top surface and the sealant top surface can encapsulate a module circuit. The antenna walls can define an enclosed area and corresponding enclosed volume of the module substrate surface surrounded by the antenna walls or an enclosed volume encapsulated by the module substrate surface, the antenna walls, and the cap. The module circuit can be disposed on or in the module substrate in the enclosed area or enclosed volume and can be electrically connected to the antenna and responsive to electrical signals received from the antenna.

According to embodiments of the present disclosure, a method of making a micro-module comprises providing a module substrate having a module substrate surface, disposing a module circuit over, on, or in the module substrate, disposing an antenna on the module substrate surface, the antenna extending along the module substrate surface in a direction parallel to the module substrate surface and extending away from the module substrate surface in a direction perpendicular to the module substrate surface to an antenna top surface thereby defining antenna walls and an at least partially enclosed area of the module substrate enclosing the module circuit, and disposing a cap on the antenna top surface encapsulating the module circuit. Methods of the present disclosure can further comprise disposing a sealant on the module substrate surface and on at least a portion of the antenna walls extending to a sealant top surface before disposing the cap. The sealant can extend to the antenna top. The antenna can be disposed on the module substrate surface after disposing the module circuit over, on, or in the module substrate or the antenna can be disposed on the module substrate surface before disposing the module circuit over, on, or in the module substrate.

In some embodiments, a micro-module comprises a module substrate having a module substrate surface, an antenna disposed on the module substrate surface, and a module circuit disposed on or in the module substrate and electrically connected to the antenna. The module circuit can be encapsulated in an enclosed area that is within an outer perimeter of the antenna. In some embodiments, the module circuit can be encapsulated by at least the antenna, the module substrate, a cap, and sealant.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which:

FIG. 1D is a cross section of a micro-module taken across cross section line A of FIG. 1C according to illustrative embodiments of the present disclosure;

FIG. 3A is a plan view and FIG. 3B is a cross section of a micro-module with a partially filling encapsulation according to illustrative embodiments of the present disclosure;

FIG. 5A is a plan view and FIG. 5B is a cross section of a micro-module with encapsulation provided between the cap and the module substrate according to illustrative embodiments of the present disclosure;

Figure 1A:
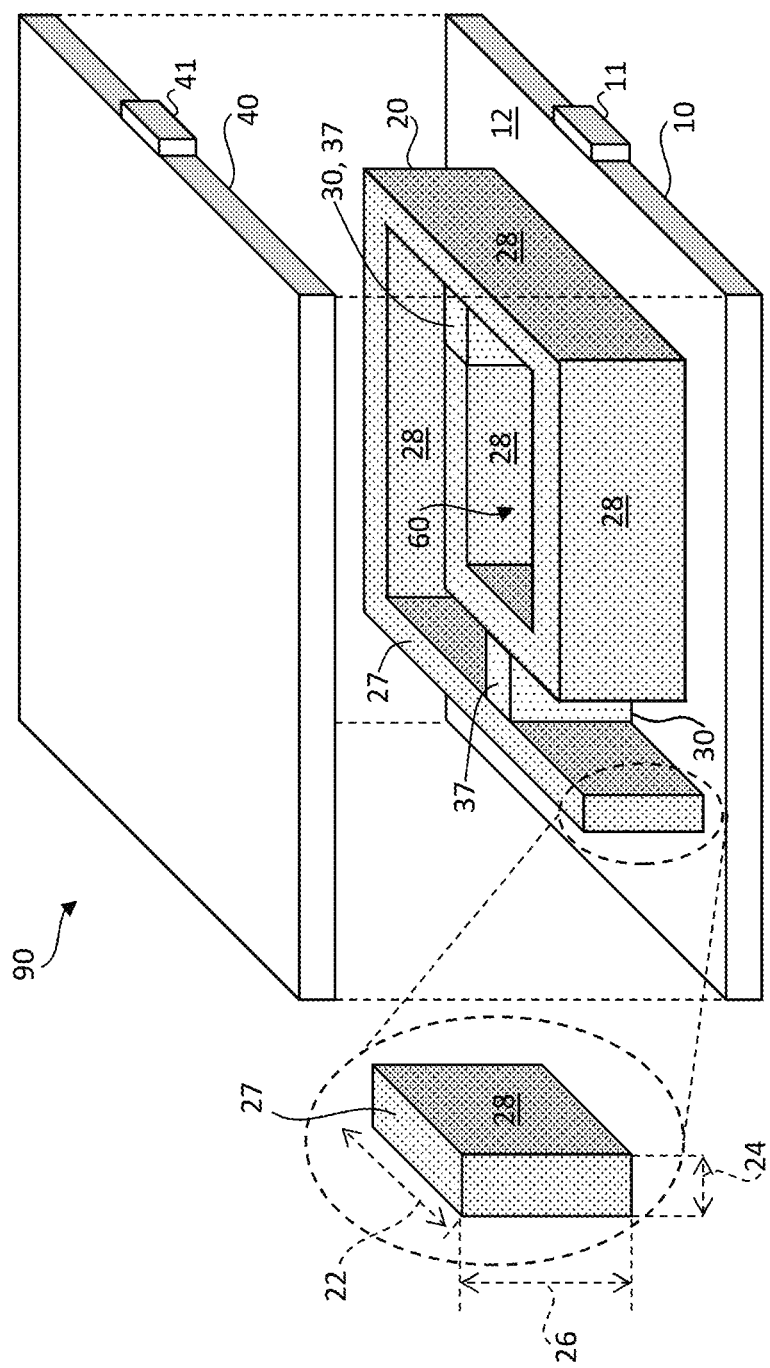
FIG. 1A is an exploded perspective of a micro-module according to illustrative embodiments of the present disclosure.
Figure 1B:
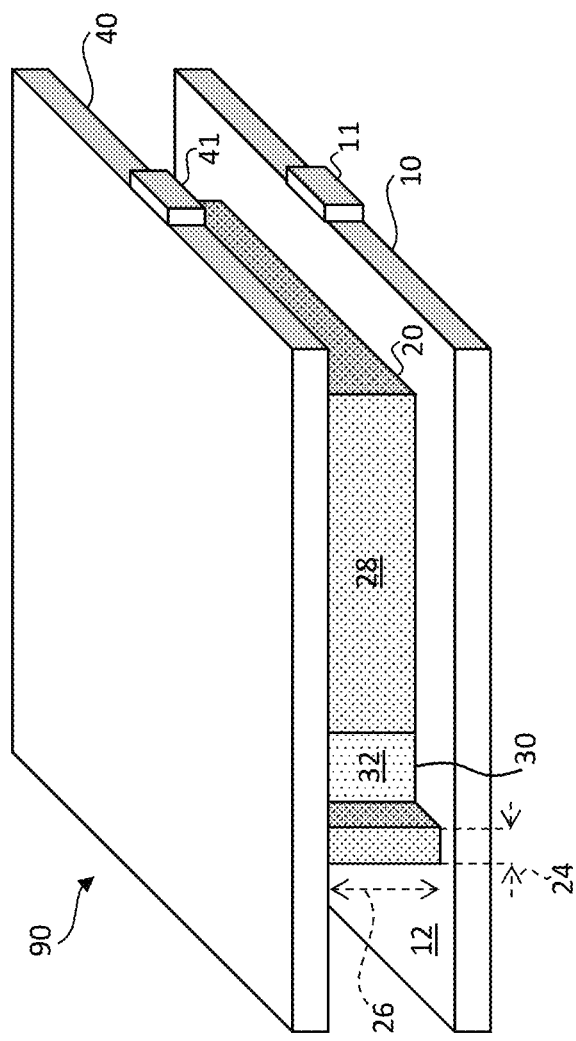
FIG. 1B is a perspective of a micro-module corresponding to FIG. 1A according to illustrative embodiments of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not drawn to scale since the variation in size of various elements in the Figures is too great to permit depiction to scale.

DETAILED DESCRIPTION OF THE DISCLOSURE

Embodiments of the present disclosure provide, among other things, methods, structures, and devices that provide environmental protection and structural support to micro-modules comprising antennas (antennae). In various applications, for example, the micro-modules can be integrated into documents or packages.

According to some embodiments and as illustrated in FIGS. 1A-1D, a micro-module 90 comprises a module substrate 10 having a module substrate surface 12. An antenna 20 is disposed on module substrate surface 12. Antenna 20 extends along module substrate surface 12 in a direction parallel to module substrate surface 12 and extends away from (protrudes from) module substrate surface 12 in a direction perpendicular (orthogonal) to module substrate surface 12 to an antenna top surface 27 thereby defining antenna walls 28, e.g., antenna sides 28. A sealant 30 is disposed on module substrate surface 12 and on (e.g., in contact with) at least a portion of antenna walls 28 and extends to a sealant top surface 37, for example at least to antenna top surface 27, so that sealant extends along at least a portion of module substrate surface 12, extends onto at least a portion of antenna walls 28, and extends away from module substrate surface 12 in a direction orthogonal to module substrate surface 12. Sealant top surface 37 can be coplanar with antenna top surface 27 (as shown in FIG. 1A) or can extend above antenna top surface 27 in a direction away from module substrate surface 12 and optionally on antenna top surface 27 (e.g., above, over, or on top of antenna top surface 27). Sealant 30 (and sealant top surface 37) can extend from one antenna wall 28 to another antenna wall 28 or from one portion of an antenna wall 28 to another separate portion of an antenna wall 28. Antenna walls 28 and sealant 30 can enclose a central enclosed area 60 (partially defining a central enclosed volume 60 or central sealed chamber 34) of or on module substrate surface 12 surrounded by antenna walls 28 and sealant 30. Sealant 30 can be patterned, as shown in FIGS. 1A-1D, or unpatterned.

A module circuit 50 can be disposed on or in module substrate 10 (for example on module substrate surface 12) in central enclosed area 60 and electrically connected to antenna 20. Module circuit 50 can be native to or non-native to module substrate 10. Module circuit 50 can be responsive to electrical signals (e.g., power) received from antenna 20.

A cap 40 can be disposed on antenna top surface 27 and sealant top surface 37, for example adhered to antenna top surface 27, sealant top surface 37, or both, and together with sealant 30, module substrate 10 and antenna 20, enclosing and encapsulating module circuit 50. Module substrate 10, antenna 20 (e.g., antenna walls 28), sealant 30, and cap 40 can form one or more complete and continuous barriers (e.g., without holes, apertures, or gaps) and thereby encapsulate central enclosed area 60 and define a central enclosed volume 60 that provides environmental protection to module circuit 50.

In some embodiments, sealant 30 fills a volume between a portion of (e.g., interior) antenna walls 28, cap 40, and module substrate 10. In some embodiments, sealant 30 fills an entire volume between (e.g., interior) antenna walls 28, cap 40, and module substrate 10 except for central enclosed volume 60. In some embodiments, sealant 30 fills an entire volume between (e.g., interior) antenna walls 28, cap 40, and module substrate 10 including central enclosed volume 60. In some embodiments, separate portions of different sides of antenna walls 28 are adjacent and sealant 30 contacts the separate portions of the different sides, for example extending from module substrate surface 12 to antenna top surface 27 for the entire module substrate surface 12 area on which sealant 30 is disposed. Adjacent portions of different sides of antenna walls 28 are those portions of antenna walls 28 that are closer together than any other portion of antenna walls 28. Each separate and independent non-contiguous portion of sealant 30 can form a sealant plug 33 filling a volume between cap 40, module substrate 10, and the portions of different antenna sides 28 of antenna 20. There are no holes, gaps, or apertures in sealant plug 30 so that sealant plug 33 forms a complete barrier between antenna walls 28, cap 40, and module substrate 10.

In embodiments of the present disclosure, module substrate 10 can be any suitable surface on which antenna 20, sealant 30, and module circuit 50 can be disposed. For example, module substrate 10 can be a material that provides a hermetic seal, such as glass, a semiconductor such as silicon, or ceramic. Module substrate 10 can be a rigid substrate. In some embodiments, module substrate 10 can be a material that provides a barrier but not a hermetic seal, such as is the case for certain polymers. Module substrate can be a flexible substrate, for example that is more flexible than other micro-module 90 components such as antenna 20, sealant 30, or module circuit 50. Module substrate 10 can comprise multiple layers. One or more layers can be disposed on module substrate 10, for example a first layer, such as a metal layer, coated with a second layer, such as a dielectric layer, for example an organic dielectric (e.g., a polymer) or inorganic dielectric (e.g., an oxide such as silicon dioxide or a nitride such as silicon nitride). Module substrate 10 can be a substrate found in the flat-panel display industry or integrated circuit industry. Module substrate 10 can have two substantially planar, smooth, and parallel sides suitable for photolithographic processing. Module substrate 10 can have a thickness of no greater than seven hundred microns, no greater than five hundred microns, no greater than two hundred microns, no greater than one hundred microns, no greater than fifty microns, no greater than twenty microns, no greater than ten microns, or no greater than five microns. Elements of the present disclosure (e.g., antenna 20, sealant 30, and module circuit 50) can be disposed directly on module substrate 10 or on one or more layers disposed on module substrate 10.

Micro-module 90 can be a micro-device and module substrate 10 can have an area, for example, no greater than one square millimeter, no greater than 250,000 square microns, no greater than one hundred thousand microns square microns, no greater than fifty thousand microns square microns, no greater than ten thousand microns square microns, no greater than five thousand square microns, or no greater than one thousand square microns.

Cap 40 can be any suitable substrate, for example glass, ceramic, or polymer. Cap can be a rigid cap 40 and can provide a hermetic barrier, for example comprising an inorganic material, or can be a flexible cap 40 and can provide a non-hermetic barrier, for example comprising an organic material. In some embodiments, module substrate 10 is rigid and cap 40 is flexible, or vice versa. In some embodiments, module substrate 10 is more flexible than cap 40 or module substrate 10 is more rigid than cap 40. Cap 40 can comprise a same material as that of module substrate 10. Cap 40 can be relatively thin, for example having a thickness no greater than five hundred microns (e.g., no greater than one micron, two microns, five microns, ten microns, twenty microns, fifty microns, one hundred microns, or two hundred microns). Cap 40 can be constructed using photolithographic materials and methods. Cap 40 can be constructed in situ, for example formed over antenna 20 (e.g., antenna walls 28) and sealant 30. For example, materials comprising cap 40 can be deposited on antenna 20 and sealant 30.

In some embodiments, cap 40 is constructed on a cap source wafer, removed from the cap source wafer, and then transported to micro-module 90 and disposed on antenna (e.g., on antenna top surface 27 of antenna walls 28) and sealant 30 (e.g., on, over, or in direct contact with sealant top surface 37), for example by micro-transfer printing so that cap 40 can comprise a broken (e.g., fractured) or separated cap tether 41. Module substrate 10, cap 40, or both can be at least 50% transparent to visible light, for example light emitted by LED 58 of module circuit 50. Light 76 can be emitted by LED 58 through module substrate 10 in a bottom-emitter configuration or through cap 40 in a top-emitter configuration, or through both module substrate 10 and cap 40.

According to embodiments of the present disclosure, antenna 20 can comprise an electrically conductive material and can have a substantially rectangular (e.g., square) cross section in a dimension orthogonal to module substrate surface 12, for example within design and manufacturing constraints. Antenna 20 can, for example have an antenna height 26 or antenna width 24, or both, of no less than five, ten, twenty, thirty, or fifty microns. Antenna height 26 and antenna width 24 can be different or can be the same, for example twenty microns high and twenty microns wide. Antenna 20 can be made of a metal or metal alloy or comprise metal or metal alloy particles such as nano-particles, for example sintered or welded particles comprising one or more materials such as copper, aluminum, gold, silver, titanium, tungsten, or tin. Antenna 20 can be or comprise a conductive polymer. In embodiments, antenna 20 is constructed by repeatedly depositing and patterning evaporated or sputtered material onto module substrate surface 12. In some embodiments, a seed layer is patterned on module substrate surface 12 and additional material, for example copper, is deposited on the seed layer by electrodeposition, electroplating, electroless plating, or atomic layer deposition. Antenna can be constructed by sputtering or evaporation or by molecular, physical, or chemical vapor deposition. In some embodiments, antenna 20 can be constructed with a pattern of liquid or semi-liquid precursors, such as an ink comprising metal particles or comprising inkjet or screen-printing materials that are subsequently cured, for example by heating or exposure to electromagnetic radiation, to form a structure comprising fused, sintered, or welded particles, such as nano-particles. Antenna 20 can be constructed using stamps, molds, inkjets, screens, or extrusion methods.

Sealant 30 can comprise an organic or inorganic dielectric material, for example comprising a resin such as an epoxy or photoresist or an oxide or nitride such as silicon dioxide or silicon nitride. Such materials can be deposited using photolithographic processes such as evaporation, sputtering, or spin or spray coating, and if desired patterned using a patterned exposure through a mask (e.g., a photoresist) and selective etching. Any patterned masking material can be subsequently removed.

Module circuit 50 can comprise one or more electronically active components such as transistors, capacitors, resistors, inductors, and electromechanical devices such as acoustic resonators (e.g., acoustic filters). In some embodiments, module circuit 50 comprises one or more light emitters, such as light-emitting diodes 58 (LEDs) (e.g., organic or inorganic micro-light-emitting diodes), one or more memories (e.g., static or programmed random-access memories), one or more LED drivers, one or more electronic filters, one or more signal receiving circuits, one or more signal transmission circuits, or a combination thereof. Module circuit 50 can be electrically connected to antenna 20, for example with one or more wires 52 on module substrate 10 made by photolithographic methods and materials (e.g., metal deposition by sputtering or evaporation followed by patterning with a mask, etching, and mask removal). In some embodiments, module circuit 50 is operable to receive electrical signals from antenna 20. The electrical signals can provide electrical power (e.g., can be a power signal) to module circuit 50. The electrical signals can alternatively or additionally provide data (e.g., the received signal can be modulated) to module circuit 50. Module circuit 50 can respond to the electrical signals to drive an output device, such as an LED 58 or respond by transmitting a signal through antenna 20, such as an identification or information signal. Module circuit 50 can comprise a circuit controller 54 that can comprise a filter 56, for example an acoustic filter or resonator. Circuit controller 54 can comprise one or more active or passive electronic circuit components, for example transistors and capacitors. Circuit controller 54 can be an analog circuit, a digital circuit, or a mixed-signal circuit.

In some embodiments, module substrate 10 is a semiconductor substrate and module circuit 50 is native to (e.g., constructed in or on) the semiconductor substrate. The semiconductor substrate can be pattern-wise coated with a dielectric, for example between antenna 20 and module substrate 10 to electrically insulate antenna 20 from module substrate 10. In some embodiments, module substrate 10 is a dielectric (e.g., glass, ceramic, or polymer) and module circuit 50 is formed in a thin-film of organic or inorganic semiconductor material disposed on module substrate 10 so that module circuit 50 is a thin-film circuit native to module substrate 10. In some embodiments, module substrate 10 is a dielectric (e.g., glass, ceramic, or polymer) and module circuit 50 is non-native to module substrate 10, for example formed in a native source wafer and transported to module substrate 10, e.g., by micro-transfer printing.

Figure 6:
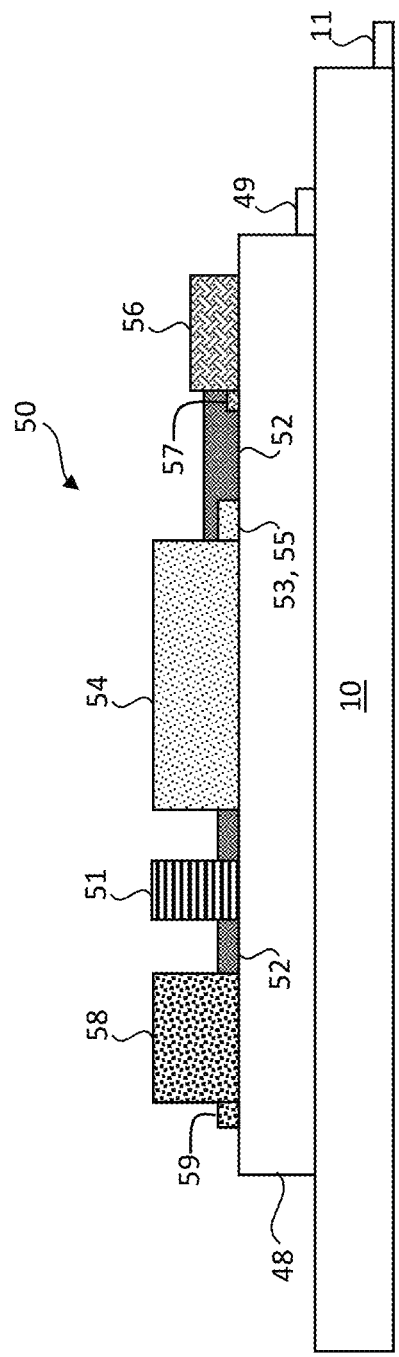
FIG. 6 is a cross section of a micro-module having a circuit substrate according to illustrative embodiments of the present disclosure.

Module circuit 50 can comprise multiple components, each disposed directly on module substrate 10. In some embodiments, module circuit 50 is disposed on a circuit substrate 48 and circuit substrate 48 is disposed on module substrate 10, for example as shown in FIG. 6. Module circuit 50 components can be native to circuit substrate 48 (e.g., where circuit substrate 48 is a silicon substrate). Module circuit 50 components can be non-native to circuit substrate 48 (e.g., where circuit substrate 48 is a glass or polymer substrate). In some embodiments where components of module circuit 50 (e.g., circuit controller 54, filter 56) are non-native to module substrate 10 or circuit substrate 48, the components can be micro-transfer printed from respective source wafers onto module substrate 10 or onto circuit substrate 48 and can each comprise a broken (e.g., fractured) or separated component tether 55 as a consequence of micro-transfer printing. In embodiments comprising circuit substrate 48 for module circuit 50, circuit substrate 48 can comprise a broken (e.g., fractured) or separated circuit substrate tether 49 as a consequence of micro-transfer printing. LEDs 58 can likewise be micro-transfer printed from an LED source wafer to module substrate 10 or circuit substrate 48 and can comprise a broken (e.g., fractured) or separated LED tether 59 as a consequence of micro-transfer printing. Micro-module 90 can also be constructed on a module source wafer and micro-transfer printed to a target substrate and can comprise a broken (e.g., fractured) or separated module tether 11.

Figure 1C:
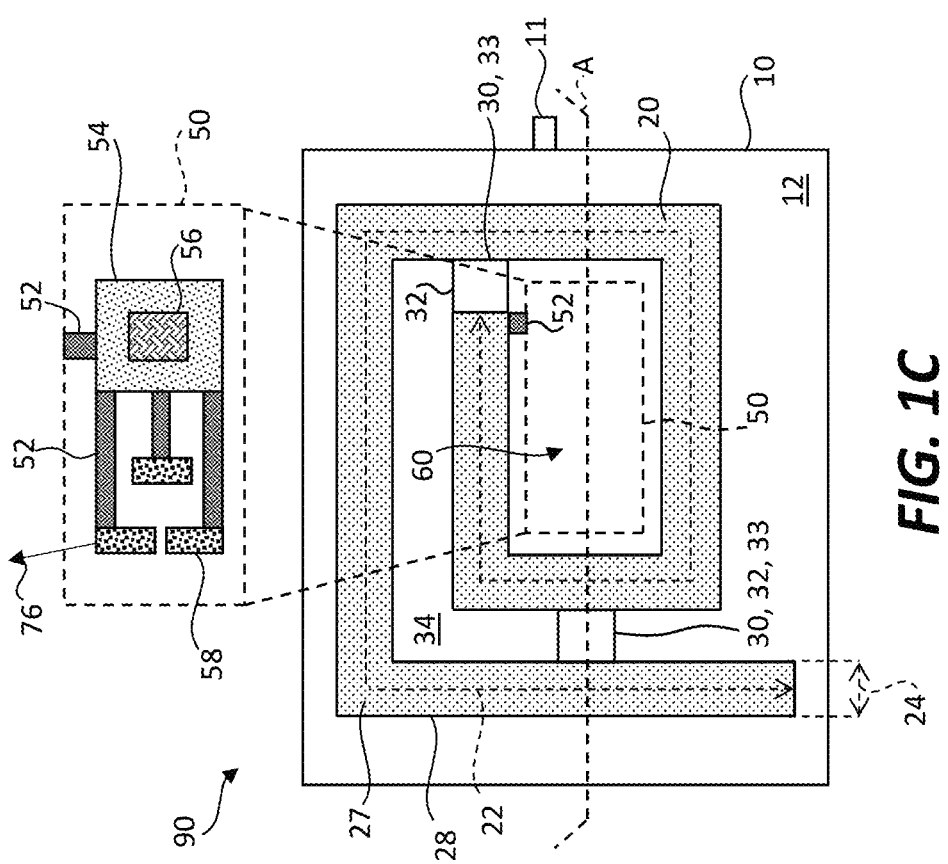
FIG. 1C is a plan view and detail of a micro-module corresponding to FIG. 1A according to illustrative embodiments of the present disclosure.

According to embodiments of the present disclosure, antenna 20 has an antenna length 22 on module substrate 10, an antenna width 24 on module substrate 10, and an antenna height 26 extending away from module substrate 10 to antenna top surface 27 (e.g., as shown in FIGS. 1A and 1C). In embodiments, antenna length 22 is greater than antenna height 26 and greater than antenna width 24. As shown in FIG. 1C and according to embodiments of the present disclosure, antenna 20 is not linear and antenna length 22 can be the length of a centerline of antenna 20 over and extending along module substrate 10. Antenna 20 can form a spiral over module substrate 10. The spiral can be a curve (e.g., a curved spiral) that moves farther away as it rotates around a point, for example a point within central enclosed area 60. The spiral can be a rectangular spiral comprising continuously connected line segments (e.g., straight portions) that are not in a common line and can define interior sides of only partially closed rectangles enclosing central enclosed area 60. Different line segments (e.g., straight portions of antenna 20) that are disposed in a common direction from central enclosed area 60 can have different distances from central enclosed area 60, as shown in FIGS. 1A, 1C, and 1D.

In embodiments of the present disclosure, sealant 30 comprises multiple separate and independent portions, each in contact with different non-contiguous portions of (e.g., interior) antenna walls 28, for example as shown in FIGS. 1A, 1C, 1D, and 2. Each sealant portion 33 (a sealant plug 33) forms a separate barrier to the ingress of gases or liquids into central enclosed volume 60 (central enclosed area 60). Certain embodiments of the present disclosure comprise one or more separate and independent sealant 30 portions.

Antenna 20 can have multiple turns or multiple layers and can form a spiral. Each sealant portion 33 can contact opposite, opposing, and adjacent antenna sides 28 of antenna 20 (or, in one sealant 30 portion 33, an end of antenna 20 adjacent to central enclosed volume 60). Sealant 30 portions 33 can each define a continuous sealant wall 32 or sealant plug 33 extending from antenna wall 28 to opposing antenna wall 28 and from module substrate 10 to cap 40 at least in a continuous simple closed curve disposed on antenna wall 28, opposing antenna wall 28, module substrate 10, and cap 40, without holes, apertures, or gaps. Sealant 30 portions can define multiple separate enclosed volumes 34 (sealed chambers 34). In embodiments of the present disclosure and as shown in the plan view of FIG. 2, sealant 30 portions 33 (sealant plugs 33) can extend radially from a central point in central enclosed area 60 defining enclosed volumes 34 (sealed chambers 34). The multiple separate sequential enclosed volumes 34 (sealed chambers 34) can be disposed along a spiral of antenna length 22 of antenna 20 from one end of antenna 20 to the other end of antenna 20 along module substrate 10, as shown in FIG. 2.

Figure 2:
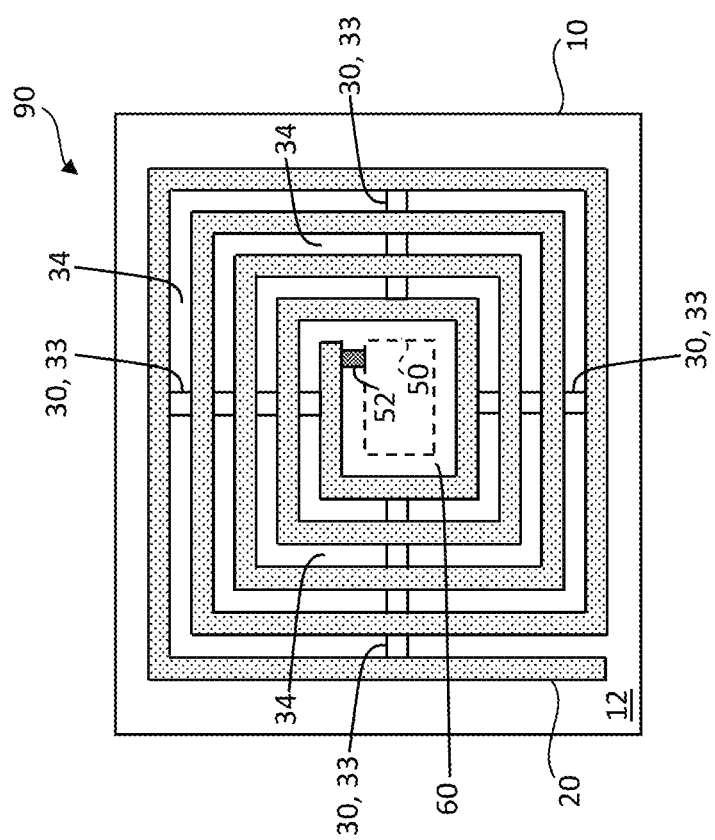
FIG. 2 is a plan view of a micro-module according to illustrative embodiments of the present disclosure.
Figure 4A:
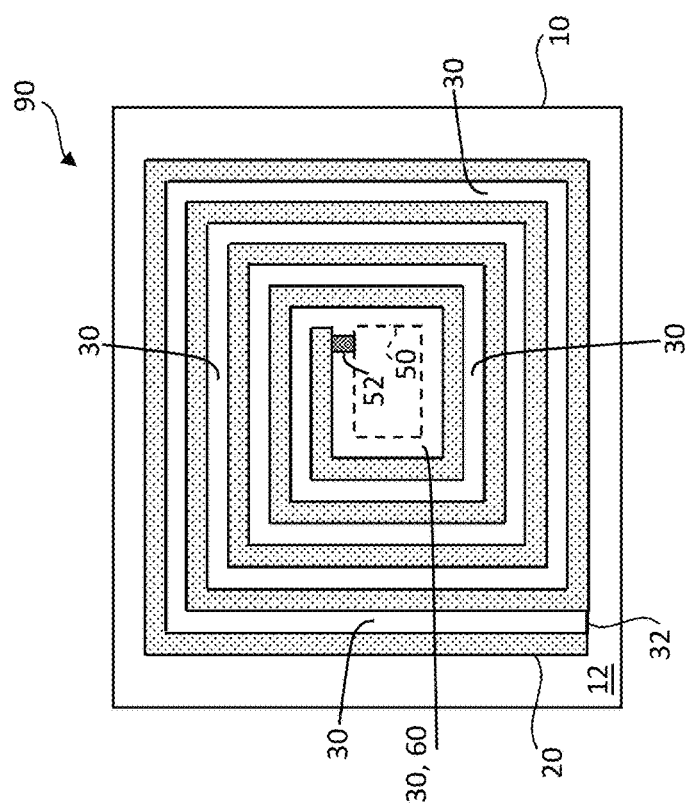
FIG. 4A is a plan view and FIG. 4B is a cross section of a micro-module with a completely filling encapsulation according to illustrative embodiments of the present disclosure.
Figure 4B:
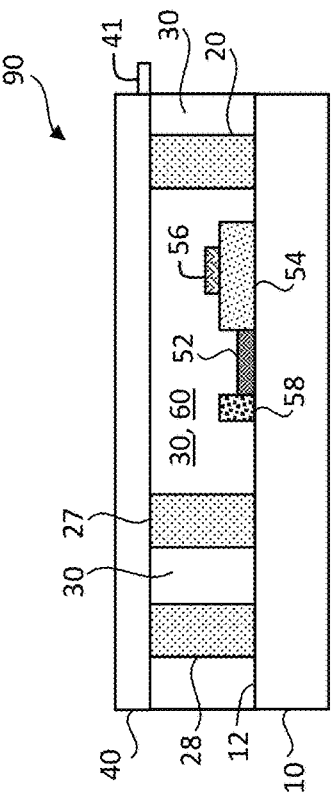

In embodiments of the present disclosure, sealant 30 can comprise separate and independent non-contiguous portions that define multiple separate enclosed volumes 34, as shown in FIGS. 1A-2. In some embodiments of the present disclosure, sealant 30 fills the volume between antenna walls 28 defining a solid, continuous, and contiguous structure at least between antenna walls 28 except for central enclosed volume 60, as shown in FIGS. 3A and 3B. In some embodiments of the present disclosure, sealant 30 fills the volume between antenna walls 28 defining a solid, continuous, and contiguous structure at least between antenna walls 28 including central enclosed volume 60, as shown in FIGS. 4A and 4B. In some embodiments of the present disclosure, sealant 30 fills the volume between module substrate 10 and cap 40 defining a solid, continuous, and contiguous structure at least between antenna walls 28 including central enclosed volume 60, as shown in FIGS. 5A and 5B.

As shown in FIG. 6, in some embodiments module circuit 50 can comprise various components, for example LED 58, circuit controller 54, capacitor 51, wires 52, and a filter 56. In some embodiments, the various components can be disposed on module substrate 10. In some embodiments, various components can be disposed on a circuit substrate 48 and circuit substrate 48 disposed on module substrate 10. Circuit substrate 48 can be a semiconductor substrate (e.g., silicon) and components of module circuit 50 can be formed on or in and native to circuit substrate 48. In some embodiments, circuit substrate 48 can be at least partially transparent or reflective, e.g., at least 50% transparent or reflective to visible light. Circuit substrate 48 can be glass, ceramic, or polymer. In some embodiments, the module circuit components can be micro-transfer printed from respective native source wafers to non-native module substrate 10 or to non-native circuit substrate 48 and can each comprise a broken (e.g., fractured) or separated tether (generically referred to as a component tether 55), for example LED 58 can comprise a broken (e.g., fractured) or separated LED tether 59, circuit controller 54 can comprise a broken (e.g., fractured) or separated controller tether 53, and filter 56 can comprise a broken (e.g., fractured) or separated filter tether 57. Module circuit 50 itself, when disposed on circuit substrate 48, can be a micro-transfer printed structure and module substrate 10 can comprise a broken (e.g., fractured) or separated module tether 11.

Figure 7:
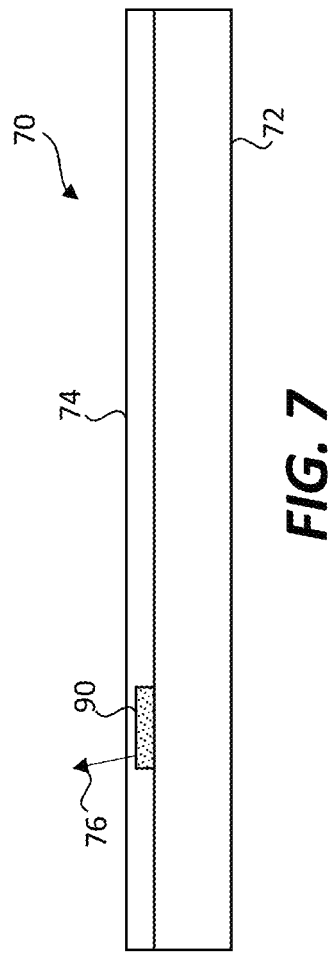
FIG. 7 is a cross section of a document having a micro-module according to illustrative embodiments of the present disclosure.

As shown in FIG. 7, module substrate 10 or micro-module 90 can be incorporated into a document 70, such as a financial instrument (e.g., a banknote, a stock certificate, bond, or bearer bond), an identification document (e.g., a passport, a license such as a driver's license, military identification, or other government-issued document), or a label (e.g., a container label). Micro-module 90 can be disposed on or in a document substrate 72 material or material layer. Micro-module 90 can be laminated between layers, for example between a laminating layer 74 and a document substrate 72. In some embodiments, when disposed on or laminated under a laminating layer 74, laminating layer 74 can be at least partially transparent to light 76 emitted by LED 58, e.g., at least 50% transparent. In some embodiments, when disposed on or laminated under laminating layer 74, laminating layer 74 can be at least partially reflective to light emitted by LED 58, e.g., at least 50% reflective. Similarly, document substrate 72 can be at least partially transparent or reflective, e.g., at least 50% transparent or reflective. In some embodiments, at least one of document substrate 72 and laminating layer 74 is at least partially transparent. In some embodiments, at least one of document substrate 72 and laminating layer 74 is at least partially transparent and one is at least partially reflective. In some embodiments, document substrate 72 can be or comprise paper, cloth, or polymer (plastic), or a combination of such materials. Laminating layer 74 can be a transparent polymer, such as mylar, or a reflective aluminized polymer. Micro-module 90 can be a security feature in an anti-counterfeiting module.

A "document" can be a security document. Document 70 can be a government-issued document 70 (e.g., a banknote or identification document) and can include visible markings such as value indicators, decorative elements, and anti-counterfeiting structures or markings. Micro-modules 90 (e.g., light-emitting micro-modules 90) can be disposed on or embedded in document 70, document substrate 72, or laminating layer 74, for example disposed on or embedded in the material on which the visible markings are printed or disposed on or embedded in other elements of document 70, document substrate 72, or laminating layer 74, such as a thread, ribbon, film, decal, or flexible substrate. Each document 70 and micro-module 90 can comprise an antenna 20 with multiple turns, an electronic module circuit 50, and one or more light emitters (e.g., LEDs 58) mounted and electrically connected on module substrate 10 or circuit substrate 48 that is separate and independent from document substrate 72 except insofar as the one is affixed to the other. Antenna 20 can be a near-field communication (NFC) antenna 20 or an RFID antenna 20 that provides electrical power to module circuit 50 in response to received electromagnetic radiation so that module circuit 50 is responsive to electrical power provided from antenna 20 to control the light emitter (s) (LED(s) 58) to emit light 76. In some embodiments, module circuit 50, and any LED 58 therein, is powered solely by the energy received from antenna 20. In some embodiments module circuit 50 or document 70 does not include any devices for storing energy between uses, such as a battery.

Module circuit 50 can include a memory for storing information. Module circuit 50 can be connected to one or more light emitters 58 and can include circuitry for controlling LED(s) 58 to emit light 76 when electrical power is provided from antenna 20. Micro-module 90 and module circuit 50 can include a power converter that converts a signal with a relatively high current and low voltage to a signal with a relatively high voltage and low current. Module circuit 50 can also or alternatively include an acoustic wave filter 56 for converting the impedance of the electrical power provided from antenna 20 in response to received electromagnetic radiation. Acoustic wave filter 56 can be a power converter.

In some embodiments, micro-module 90 is a small micro-transfer printable module, for example formed on a semiconductor or other substrate such as glass or plastic having an area less than 500,000, 250,000, 100,000, 50,000, 20,000, 10,000, 5,000, 1,000, 500, 250, or 100 square microns. Acoustic wave filter 56 can be a surface acoustic wave filter (SAW) or bulk acoustic wave filter (BAW), for example including aluminum nitride (AlN), and the light emitter can be an inorganic light-emitting diode (LED) 58, for example made with a compound semiconductor such as GaN or AlGaN.

Any one or all of optional acoustic wave filter 56, LED 58, and module circuit 50 can be assembled on module substrate 10 or circuit substrate 48 using micro-transfer printing and electrically interconnected with electrically conductive wires 52, for example using photolithographic methods and materials, to form micro-module 90. Micro-module 90, with its various components including the module substrate 10, can, in turn be micro-transfer printed or otherwise printed, transferred, or assembled onto another substrate such as document substrate 72 to form a hybrid document 70 or onto a tape or reel for high-speed printing onto a sheet or web, such as a sheet or web of documents 70 or flexible substrates incorporated into documents 70 such as banknotes.

In some embodiments of the present disclosure, document 70 includes a plurality of micro-modules 90 and there is no electrical interconnection between the various micro-modules 90 so that each micro-module 90 is electrically separate, independent, and disconnected from each other and any other electrical components included in document 70. Each of micro-modules 90 can be spatially separated and physically independent and separated, although micro-modules 90 can be arranged in a desired pattern on document 70, for example arranged in the shape of a graphical indication. Micro-modules 90 can be disposed to form any one or more of a character, a graphic indicator, an icon, a number, a letter, and a pictogram or indicates a value, a date, or a person. The graphic indicator can have semantic content, for example indicating a value, a date, or a person.

In some embodiments, when document 70 is placed near a near-field-communication field, for example a near-field-communication field generated by a smartphone or other NFC device, antenna 20 of each micro-modules 90 will receive electromagnetic radiation and generate electrical power, optionally voltage amplified and filtered by the acoustic wave filter 56, to module circuit 50 to cause one or more LEDs 58 to emit light 76. Because the signal harvested from antenna 20 is relatively small, it is helpful to have as long an antenna 20 extending with as many turns as possible in micro-modules 90 to provide enough power to light one or more LEDs 58. The signal received typically has a relatively smaller voltage and larger current. Thus, in some embodiments, module circuit 50 includes acoustic wave filter 56 that is also a power converter 56 that converts the received signal to a signal with a relatively larger voltage and smaller current more suitable for providing power to module circuit 50 and for LED 58.

Figure 8:
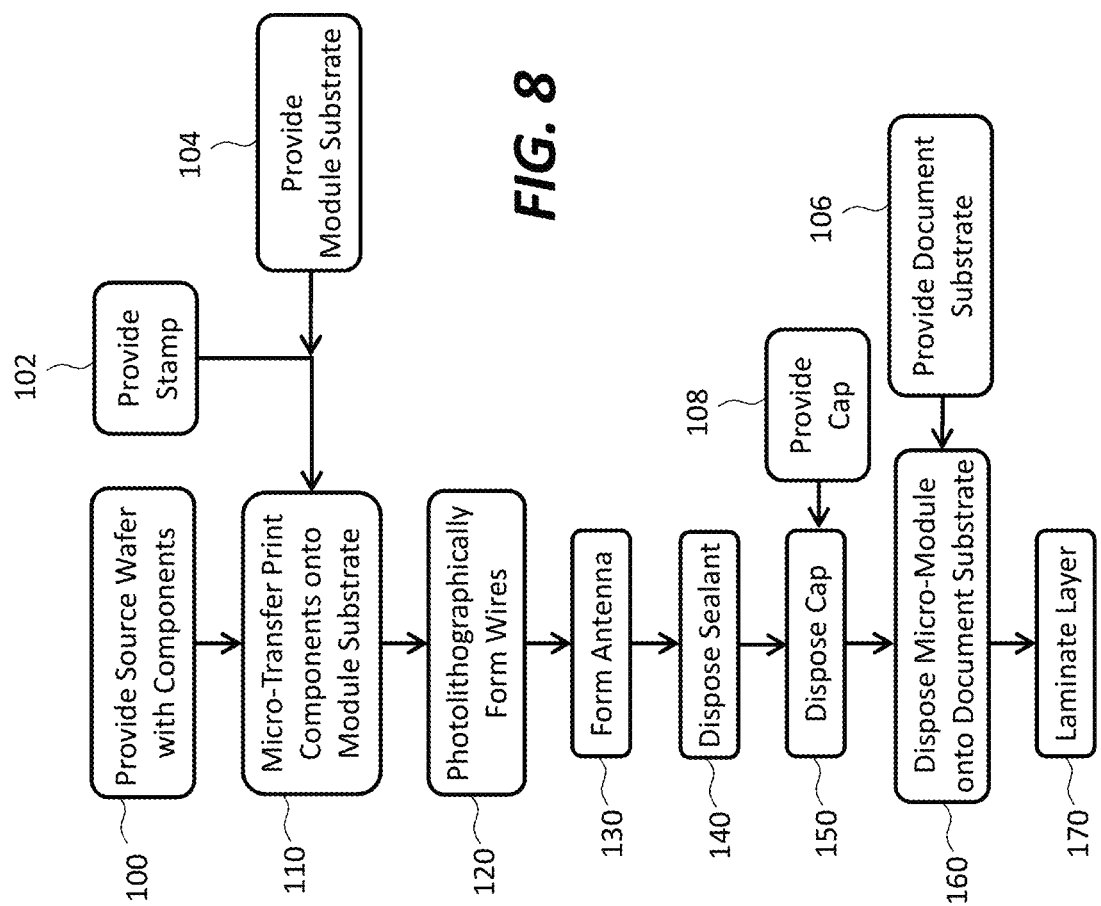
FIGS. 8-11 are flow graphs of methods according to illustrative embodiments of the present disclosure.
Figure 12:
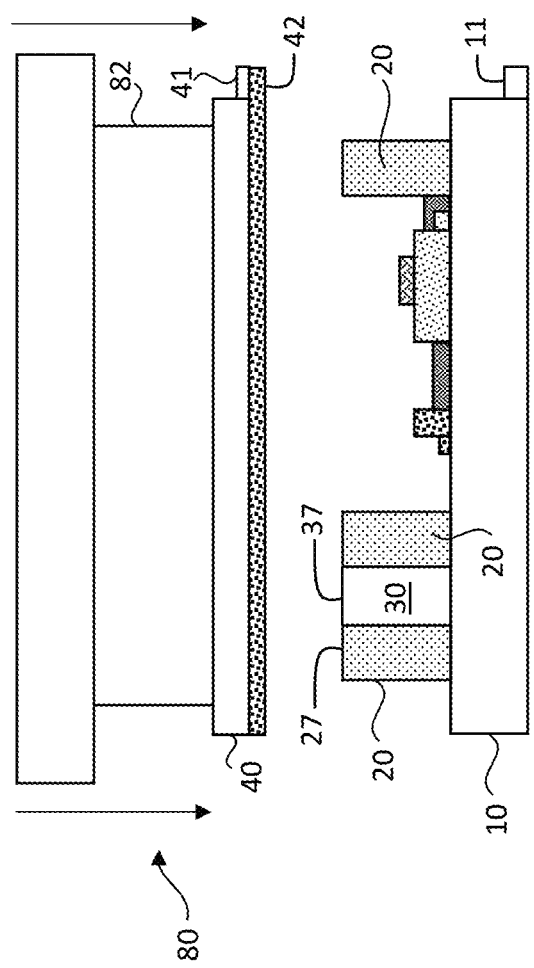
FIG. 12 is a cross section illustrating methods of assembling a cap onto an antenna and sealant according to illustrative embodiments of the present disclosure.

As illustrated in FIG. 8 in embodiments of the present disclosure, a source wafer with components for each component in module circuit 50 is provided in step 100, for example using photolithographic materials and methods. A stamp 80 is provided in step 102 (e.g., as shown in FIG. 12), for example a PDMS stamp 80 with a stamp post 82 made with a patterned mold cast on a silicon substrate, a module substrate 10 is provided in step 104, for example a glass or polymer substrate, a document substrate 72, for example a banknote, ribbon, or thread is provided in step 106, and a cap 40 is provided in step 108, for example a flat structure provided on a cap source wafer. The components are printed from the native module source wafers onto module substrate 10 with stamp 80 in step 110. Wires 52 are photolithographically formed and patterned on module substrate and electrically connected to the components in module circuit 50 in step 120. Antenna 20 is formed on module substrate 10 and in electrical contact with a wire 52 in step 130, for example by plating with copper a seed layer deposited and patterned using photolithography. In some embodiments, wires are formed in step 120 after antenna 20 is formed in step 130 (not shown in the Figures).

Sealant 30 can be disposed (e.g., by spray coating a dielectric such as an epoxy or evaporating or sputtering an oxide such as silicon dioxide or nitride such as silicon nitride, or by inkjet printing and curing a curable dielectric material) and can extend up to or over antenna top surface 27 (e.g., as in FIGS. 4B and 5B) in step 140. Module circuit 50 on module substrate 10 can be, but is not necessarily, encapsulated during steps 130, 140 to protect module circuit 50 and any encapsulation removed, if desired, after step 130, 140. In some embodiments, as in FIG. 3B, sealant 30 is patterned (e.g., by pattern-wise deposition or by using a photomask and etching) to define sealant walls 32 in step 140. Cap 40 is disposed on and adhered to antenna top surface 27, or sealant 30, or both to encapsulate micro-module 90 in step 150 (e.g., as shown in FIG. 12). Micro-module 90 is then disposed on document substrate 72 in step 160 and laminating layer 74 can be laminated over micro-module 90 and document substrate 72 in step 170 to form document 70. Micro-modules 90 can be disposed on document substrate 72 by pick-and-place from diced wafers on dicing tape, from a tape- and reel assembly, or by micro-transfer printing from a module source wafer using a stamp 80. Laminating layer 74 can be laminated, for example by using a roller or hot pressing an adhesive-coated laminating layer 74, e.g., a ribbon or thread.

Figure 9:
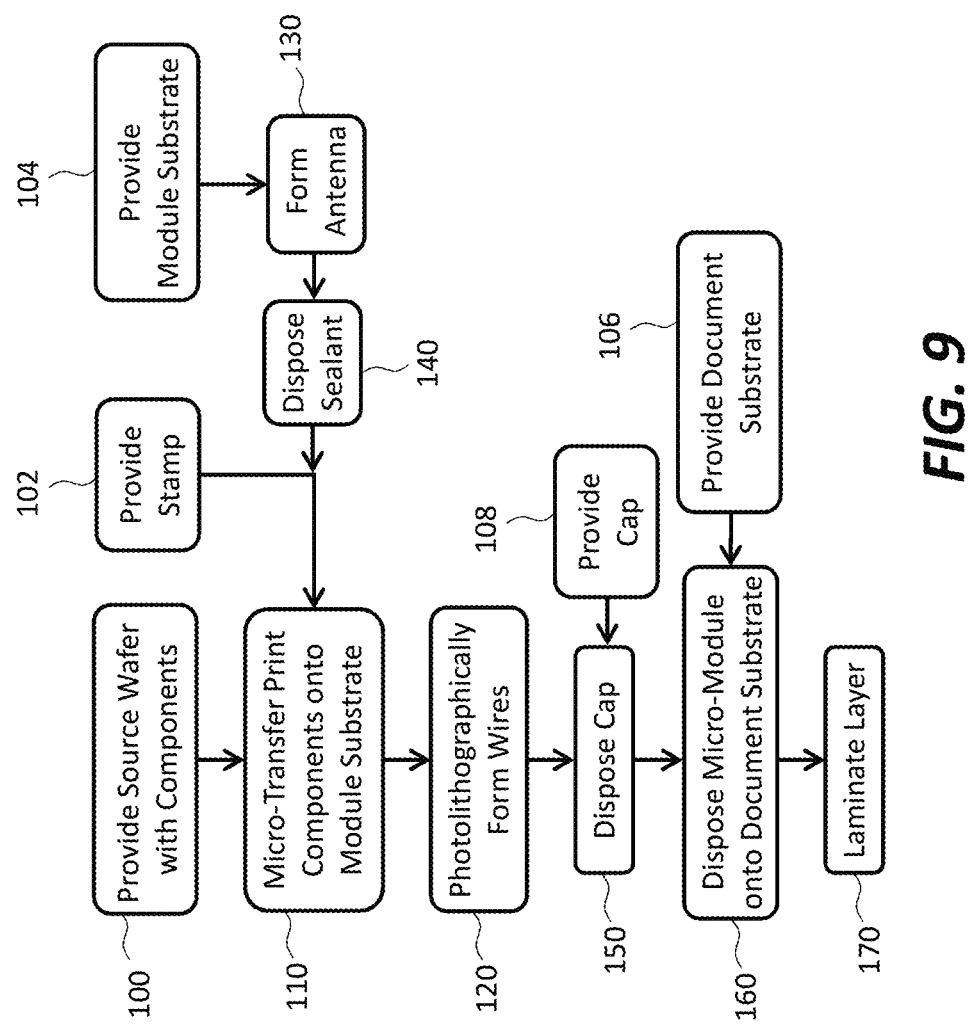

As shown in FIG. 9, antenna 20 can be formed in step 130 before module circuit 50 is formed or disposed on module substrate 10 in step 110. In some embodiments, sealant 30 can also be deposited and patterned in step 140 after step 130 and before module circuit 50 is formed or disposed on module substrate 10 in step 110.

Figure 10:
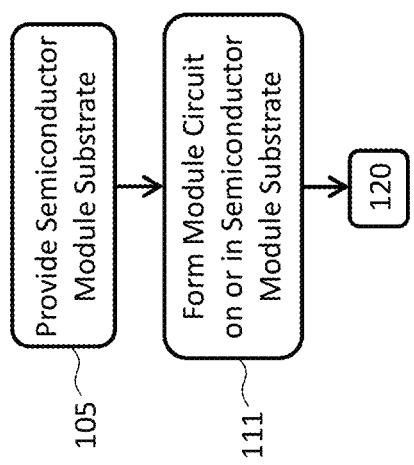

As shown in FIG. 10, module substrate 10 can be a semiconductor substrate provided in step 105 and module circuit 50 (or some components of module circuit 50) can be native to (e.g., formed in or on) module substrate 10 by photolithography in step 111. In some embodiments, one or more elements or components of module circuit 50 are formed in or on and native to module substrate 10 and one or more elements or components of module circuit 50 can be micro-transfer printed from respective source wafers to module substrate 10.

Figure 11:
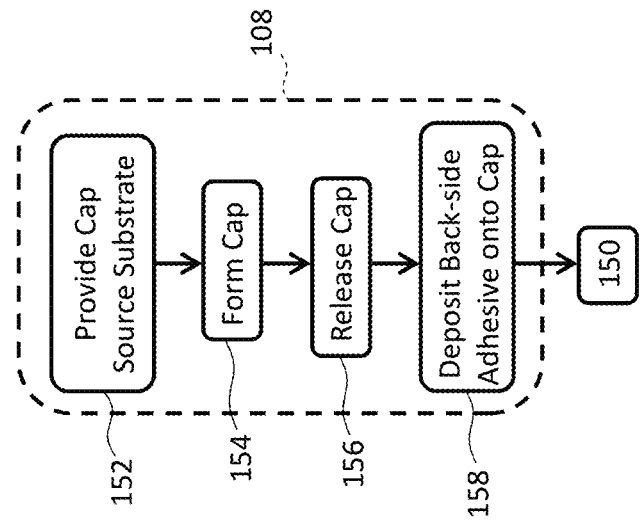

As illustrated in FIG. 11, cap 40 can be made in step 108 on a cap source substrate (wafer) provided in step 152 using photolithography in step 154, released in step 156 (e.g., under etched), provided with a back-side adhesive in step 158, for example as disclosed in U.S. Pat. No. 11,398,399, and then adhered to antenna 20, sealant 30, or both in step 150, for example by micro-transfer printing from the cap source wafer, to form micro-module 90. As illustrated in FIG. 12, cap 40 with back-side adhesive 42 can be micro-transfer printed from a cap source wafer to antenna 20 and sealant 30 using a stamp 80 with cap 40 adhered to stamp post 82 in step 150. Cap 40 can be a substantially rectangular plate. Stamp 80 with cap 40 adhered to stamp post 82 contacts adhesive layer 42 on cap 40 to antenna top surface 27 and sealant top surface 37 in step 150 to adhere cap 40 to antenna top surface 27 and sealant top surface 37, forming micro-module 90. In some embodiments, adhesive 42 can cured by heat or radiation.

A plurality of module substrates 10 can each be provided and a micro-module 90 made individually on each module substrate 10. In a more efficient process, module substrate 10 is originally much larger than antenna 20, module circuit 50, and wires 52 and multiple micro-modules 90 are formed on a common module substrate 10 at the same time using the same process steps, such as micro-transfer printing, photolithographic steps, coating, or combinations thereof. Module substrate 10 can then be diced, for example by scribing and breaking, diamond saw cutting, or laser cutting, to form the individual micro-modules 90, such as surface-mount devices or micro-transfer printable components. However, it is an advantage of embodiments of the present disclosure that very small micro-modules 90 can be formed so that conventional methods of separating individual micro-modules 90 or disposing micro-modules 90 onto a document substrate 72 (e.g., a polymer ribbon) can be difficult. Therefore, in an embodiment of the present disclosure, micro-modules 90 are micro-transfer printable micro-modules 90 formed over sacrificial portions of a sacrificial layer and fastened with tethers to anchors on a module source substrate or wafer. The individual micro-modules 90 are then disposed on document substrate 72 (step 160) using micro-transfer printing stamps 80 to contact micro-modules 90, the tethers are broken (e.g., fractured) or separated, micro-modules 90 are transferred to document substrate 72, for example on an adhesive layer on document substrate 72), and stamp 80 is removed. Document substrate 72 can be document 70 itself or a ribbon laminated onto a document 70 (in which case the ribbon is document substrate 72 and the document is laminating layer 74).

In some embodiments, micro-modules 90 of the present disclosure can emit light 76 when micro-modules 90 are located in an NFC magnetic field, for example similar to those found in existing NFC terminals or smart phones. In some embodiments, the NFC field can provide a continuous or pulsed NFC signal having a frequency of at least ten, at least twenty, at least fifty, or at least one hundred pulses per second or greater. This pulse rate can be much higher than those found in conventional NFC terminals or smart phones so that micro-modules 90 of the present disclosure will emit light 76 at a sufficient frequency as to be visible to the human eye. In some embodiments, the NFC field can operate for 2 msec out of every 20 msec and at a 50 Hz or 60 Hz frequency. Each such NFC circuit can drive thousands of micro-modules 90 to emit light, enabling a wide variety of patterns, applications, and effects. In some embodiments of the present disclosure, module circuit 50 stores information, for example identification information such as a serial number, value information, manufacturing information, usage information, or location information. This information can be retrieved using RFID or NFC techniques and read back from a micro-module 90.

Module circuit 50 can be an integrated circuit, for example a small chiplet, suitable for micro-transfer printing. Module circuit 50 can include digital circuits or logic (for example CMOS circuits) and power circuits (for example for driving an LED or a transmission signal). Module circuit 50 can include information storage circuits, a state machine, or a stored program machine to implement the desired functionality of the micro-module 90. Module circuit 50 can read or write information, process information, respond to input, and provide output.

In some embodiments, LEDs 58 and module circuit 50 are too small to be readily visible with the unaided human eye. Furthermore, micro-modules 90 can be located in areas of document 70 that include visible markings to further obscure the presence of micro-module 90. Since micro-modules 90 can be very small, for example having a size in the micron range, they can be effectively invisible to the unaided human eye. For example, micro-modules 90 can have a length and width each independently no greater than 1 mm, no greater than 500 no greater than 200 no greater than 100 or no greater than 50 and, additionally or alternatively, a thickness from 2 to 5 µm, 5 to 10 µm, 10 to 20 µm, or 20 to 50 µm.

U.S. patent application Ser. No. 14/743,981, filed Jun. 18, 2015, entitled Micro-Assembled Micro LED Displays and Lighting Elements, incorporated herein by reference describes micro-transfer printing structures and processes useful with the present disclosure. For a discussion of micro-transfer printing techniques see also U.S. Pat. Nos. 8,722,458, 7,622,367 and 8,506,867, each of which is hereby incorporated by reference in its entirety. Micro-transfer printing using compound micro assembly structures and methods can also be used with the present disclosure, for example, as described in U.S. patent application Ser. No. 14/822,868, filed Aug. 10, 2015, entitled Compound Micro-Assembly Strategies and Devices, which is hereby incorporated by reference in its entirety.

As is understood by those skilled in the art, the terms "over", "under", "above", "below", "beneath", and "on" are relative terms and can be interchanged in reference to different orientations of the layers, elements, and substrates included in the present disclosure. For example, a first layer on a second layer, in some embodiments means a first layer directly on and in contact with a second layer. In other embodiments, a first layer on a second layer can include another layer there between.

Having described certain embodiments, it will now become apparent to one of skill in the art that other embodiments incorporating the concepts of the disclosure may be used. Therefore, the disclosure should not be limited to the described embodiments, but rather should be limited only by the spirit and scope of the following claims.

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as the disclosed technology remains operable. Moreover, two or more steps or actions in some circumstances can be conducted simultaneously. The disclosure has been described in detail with particular reference to certain embodiments thereof, but it will be understood that variations and modifications can be effected within the spirit and scope of the disclosure.

PARTS LIST

A cross section line
10 module substrate 11 module tether
12 module substrate surface
20 antenna
22 antenna length
24 antenna width
26 antenna height/sealant height
27 antenna top surface
28 antenna wall/antenna side
30 sealant
32 sealant wall
33 sealant plug/sealant portion
34 enclosed volume/sealed chamber
37 sealant top surface
40 cap
41 cap tether
42 adhesive/adhesive layer
48 circuit substrate
49 circuit substrate tether
50 module circuit
51 capacitor
52 wire
53 controller tether
54 circuit controller
55 component tether
56 filter/acoustic wave filter/power converter
57 filter tether
58 LED
59 LED tether
60 central enclosed area/central enclosed volume
70 document
72 document substrate
74 laminating layer
76 light
80 stamp
82 stamp post
90 micro-module
100 provide source wafer with component step
102 provide stamp step
104 provide module substrate step
105 provide semiconductor module substrate step
106 provide document substrate step
108 provide cap step
110 micro-transfer print components onto module substrate step
111 form components on module substrate step
120 photolithographically form wires step
130 form antenna step
140 dispose sealant step
150 dispose cap step
152 provide cap source substrate step
154 form cap step
156 release cap step
158 deposit back-side adhesive step
160 dispose micro-module onto document substrate step
170 laminate layer step

What is claimed is:

1. A micro-module, comprising:
a module substrate having a module substrate surface;
an antenna disposed on the module substrate surface, the antenna extending along the module substrate surface in a direction parallel to the module substrate surface and extending away from the module substrate surface in a direction perpendicular to the module substrate surface to an antenna top surface thereby defining antenna walls;
a sealant disposed on the module substrate surface and on at least a portion of the antenna walls extending away from the module substrate to a sealant top surface, wherein the antenna walls and sealant define an enclosed area of the module substrate surface surrounded by the antenna walls and the sealant;
a module circuit disposed on or in the module substrate in the enclosed area and electrically connected to the antenna and responsive to electrical signals received from the antenna; and
a cap disposed on the antenna top surface and the sealant top surface such that the module circuit is encapsulated, wherein the sealant, the antenna walls, the cap, and the module substrate define multiple separately enclosed volumes.

2. The micro-module of claim 1, wherein the antenna has an antenna length on the module substrate, an antenna width on the module substrate, and an antenna height extending away from the module substrate to the antenna top surface, wherein the antenna length is greater than the antenna height and greater than the antenna width.

3. The micro-module of claim 1, wherein the module circuit comprises a light-emitting diode, a resonator, or both a light-emitting diode and a resonator.

4. The micro-module of claim 1, wherein the module substrate, the cap, or both the module substrate and the cap are at least 50% transparent to visible light.

5. The micro-module of claim 1, wherein the antenna is operable to provide power to the module circuit with the electrical signals.

6. The micro-module of claim 1, wherein (i) the module circuit emits light in response to the electrical signals, (ii) the module circuit emits signals in response to the electrical signals, or both (i) and (ii).

7. The micro-module of claim 1, wherein the sealant comprises discrete portions that define sealant walls in contact with different portions of the antenna walls.

8. The micro-module of claim 1, wherein the antenna forms a spiral on the module substrate.

9. The micro-module of claim 1, wherein the module circuit comprises one or more components disposed on a circuit substrate and the module circuit is a micro-transfer-printed module circuit comprising a broken or separated module tether.

10. The micro-module of claim 1, wherein the module circuit comprises one or more components and at least one of the one or more components is a micro-transfer-printed component comprising a broken or separated component tether.

11. The micro-module of claim 1, wherein the module substrate is rigid, the cap is rigid, or both the module substrate and the cap are rigid.

12. The micro-module of claim 1, wherein the module substrate is flexible, the cap is flexible, or both the module substrate and the cap are flexible.

13. The micro-module of claim 1, wherein the module substrate is more flexible than the cap or wherein the module substrate is more rigid than the cap.

14. A document, comprising:
a document substrate; and
one or more micro-modules according to claim 1 disposed in or on the document substrate.

15. The document of claim 14, wherein the document substrate comprises paper, cloth, or plastic.

16. The document of claim 14, wherein the document comprises or is comprised in a banknote, passport, identification document, or financial instrument.

17. A micro-module, comprising:
a module substrate having a module substrate surface;

an antenna disposed on the module substrate surface, the antenna extending along the module substrate surface in a direction parallel to the module substrate surface and extending away from the module substrate surface in a direction perpendicular to the module substrate surface to an antenna top surface thereby defining antenna walls;

a sealant disposed on the module substrate surface and on at least a portion of the antenna walls extending away from the module substrate to a sealant top surface, wherein the antenna walls and sealant define an enclosed area of the module substrate surface surrounded by the antenna walls and the sealant;

a module circuit disposed on or in the module substrate in the enclosed area and electrically connected to the antenna and responsive to electrical signals received from the antenna; and a cap disposed on the antenna top surface and the sealant top surface such that the module circuit is encapsulated, wherein the antenna walls are interior walls and the sealant fills all volume between the antenna walls, the cap, and the module substrate except in a volume laterally bounded by the enclosed area.

18. A micro-module, comprising:

a module substrate having a module substrate surface;

an antenna disposed on the module substrate surface, the antenna extending along the module substrate surface in a direction parallel to the module substrate surface and extending away from the module substrate surface in a direction perpendicular to the module substrate surface to an antenna top surface thereby defining antenna walls;

a sealant disposed on the module substrate surface and on at least a portion of the antenna walls extending away from the module substrate to a sealant top surface, wherein the antenna walls and sealant define an enclosed area of the module substrate surface surrounded by the antenna walls and the sealant;

a module circuit disposed on or in the module substrate in the enclosed area and electrically connected to the antenna and responsive to electrical signals received from the antenna; and a cap disposed on the antenna top surface and the sealant top surface such that the module circuit is encapsulated, wherein the antenna forms a spiral on the module substrate and the sealant, the antenna walls, the cap, and the module substrate define multiple separately enclosed volumes along the length of the spiral.

* * * * *